Figure 1:
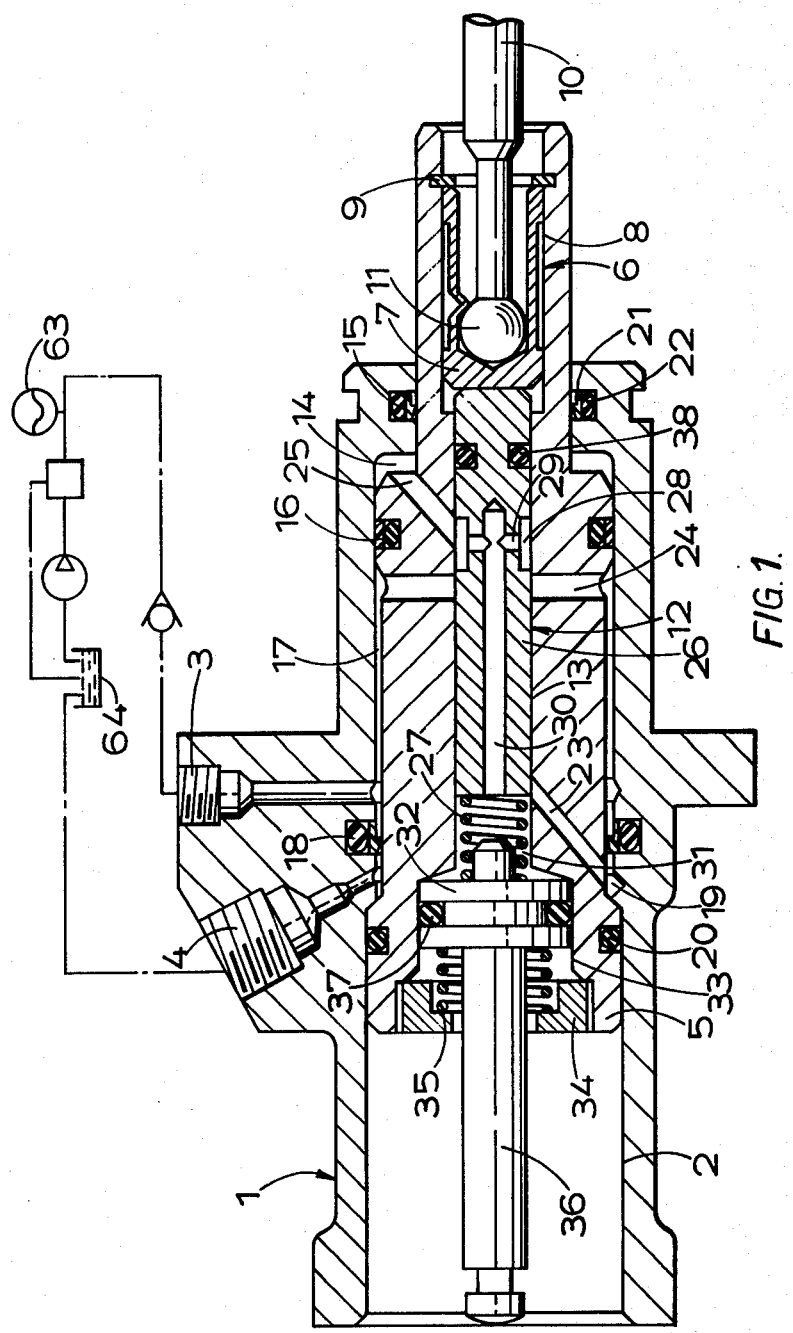

United States Patent [19]

Farr

[11] Patent Number: 4,468,927
[45] Date of Patent: Sep. 4, 1984

[54] HYDRAULIC BOOSTERS FOR VEHICLE BRAKING SYSTEMS

[75] Inventor: Glyn P. R. Farr, Warwickshire, England

[73] Assignee: Lucas Industries Public Limited Company, Birmingham, England

[21] Appl. No.: 433,238

[22] Filed: Oct. 7, 1982

[30] Foreign Application Priority Data

Nov. 7, 1981 [GB] United Kingdom ............... 8133643
Nov. 9, 1981 [GB] United Kingdom ............... 8133772

[51] Int. Cl.$^3$ .......................... F15B 9/10; F15B 15/17
[52] U.S. Cl. ................................... 60/554; 60/547.1; 91/173; 91/369 A; 91/378; 91/417 R; 92/128
[58] Field of Search ............. 91/378, 417 R, 369 A, 91/173; 60/554, 547.1; 92/128

[56] References Cited

U.S. PATENT DOCUMENTS 2,916,882 12/1959 Spalding et al. ............. 91/378
4,319,455 3/1982 Schubert ..................... 91/369 A

FOREIGN PATENT DOCUMENTS 38699 10/1981 European Pat. Off. ........... 91/378
2042113 9/1980 United Kingdom ............... 91/378

Primary Examiner—Paul E. Maslousky
Attorney, Agent, or Firm—Scrivener, Clarke, Scrivener and Johnson

[57] ABSTRACT

A hydraulic booster has a housing provided with a bore, an inlet connected to a source of high pressure fluid, an outlet connected to a reservoir and a boost piston working in the bore. The boost piston is advanced in response to pressurization of a boost chamber by fluid from the source, under the control of a valve mechanism operated by an input member. The diameters of the bore and the boost piston are arranged to provide an annular chamber round the boost piston connected to the inlet, with the sealing diameter at the rearward end greater than that at the forward end of the chamber, where the boost piston is spaced from the bore. The forward end is sealed by a seal mounted in the bore so that it is radially deformable and able to tolerate the radial clearance between the piston and the bore. The seal is preferably a P.T.F.E. ring backed by an O-ring.

7 Claims, 2 Drawing Figures

HYDRAULIC BOOSTERS FOR VEHICLE BRAKING SYSTEMS

SPECIFIC DESRIPTION

This invention relates to an hydraulic booster for a vehicle braking system of the kind comprising a housing provided with a bore, an inlet for connection to a source of high pressure hydraulic fluid and an outlet for connection to a reservoir for fluid, and a boost piston for actuating a master cylinder assembly working in the bore, in operation the boost piston being advanced in the bore in response to pressurisation of a boost chamber by fluid from the source, pressurisation of the boost chamber being controlled by valve means operable to control communication between the inlet and the boost chamber and between the boost chamber and the outlet, the valve means being operable in response to a load applied to a pedal-operated input member.

It is advantageous for boosters of the kind set forth to be as short as possible axially, to facilitate their installation in vehicles. One way of achieving a short assembly is for the bore and the boost piston to be of stepped outline, with the piston having a central portion of smaller diameter, round which respective annular chambers are defined for connection to the inlet and outlet. It is convenient to arrange the diameters so that the high pressure fluid in the annular chamber connected to the inlet acts to bias the piston rearwardly. However, this means that the sealing diameter between the bore and the boost piston at the rearward end of the annular chamber is greater than the sealing diameter between the bore and the boost piston at the forward end. This creates a problem in assembly, as an extra component has to be inserted in the bore to provide the smaller diameter for the forward seal.

According to our invention, in a booster of the kind set forth the bore and the boost piston are of stepped outline, the diameters of the bore and the boost piston being arranged and sealed to provide an annular chamber surrounding the boost piston and connected to the inlet, such that a sealing diameter of the boost piston at a rearward end of the annular chamber is greater than a sealing diameter of the boost piston at a forward end of the annular chamber, with a radial clearance provided between the boost piston and the bore at the forward end of the annular chamber, and a forward seal between the bore and the boost piston at the forward end of the annular chamber, being mounted in the wall of the bore such that the forward seal is radially deformable and is able to tolerate the radial clearance between the bore and the boost piston.

This has the advantage of simplifying the construction and assembly of the booster, since the boost piston can be assembled in the bore without the need for extra components.

The forward seal is of a type which has limited tolerance to radial clearances as well as radial resilience, and the sealing diameters of the boost piston are chosen so that the boost piston can be assembled from the forward end of the bore with the forward seal deforming radially to allow the passage of the greater, rearward sealing diameter on the boost piston, and returning to seal the lesser, forward diameter reliably.

The forward seal is preferably of a type comprising a ring of polytetrafluoroethylene (P.T.F.E.) backed by an O-ring. This type of seal can tolerate radial clearances between the surfaces it seals of up to 0.4 mm, but is capable of withstanding pressure differences up to 200 bars.

The diameters of the bore and the boost piston may be arranged so that a second annular chamber is formed round the boost piston, the second chamber being connected to the outlet. The forward seal provides a seal between the first, or high pressure annular chamber and the second, or reservoir, chamber.

In one embodiment the booster has an auxiliary piston on which fluid from the source acts on initial movement of the input member in order to take up at least part of the lost-motion in the braking system before the boost piston is advanced in the bore.

In another embodiment the booster is of the output reactive type in which the reaction felt at the pedal depends on the load applied to the master cylinder assembly and not on the magnitude of the boost pressure acting on the boost piston. The load from the master cylinder assembly is transmitted to the pedal-operated input member through a reducer mechanism, which comprises a rubber block, and the valve means.

The valve means may comprise a spool working in a bore in the boost piston.

The pedal-operated input member suitably comprises an input piston also working in a bore in the boost piston.

Figure 2:
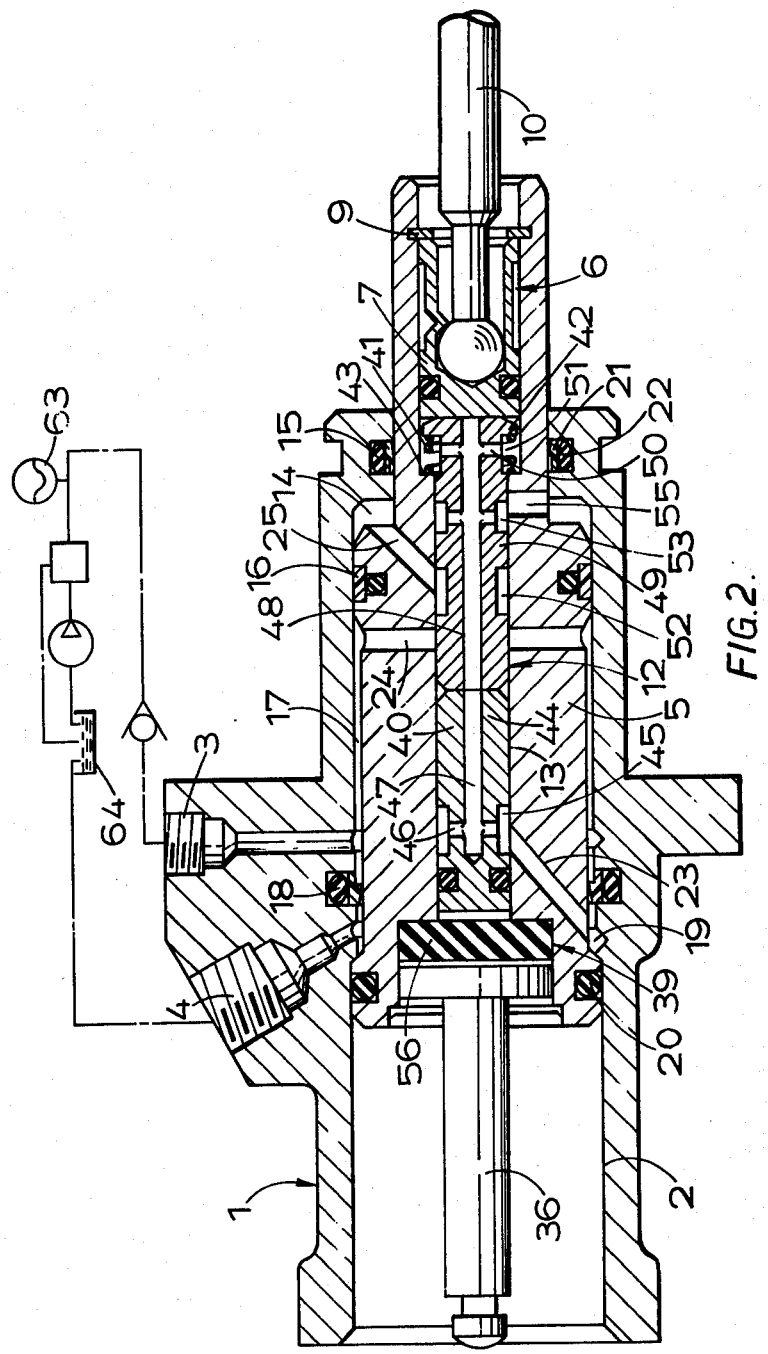

Two embodiments of our invention are illustrated in the accompanying drawings, in which FIG. 1 is a longitudinal section through an hydraulic booster; and FIG. 2 is a longitudinal section through a further hydraulic booster.

The booster of FIG. 1 has a housing 1 provided with a longitudinal stepped bore 2, an inlet 3 for connection to a source of high pressure hydraulic fluid, suitably an accumulator 63 and an outlet 4 for connection to a reservoir 64 for fluid. A stepped boost piston 5 works in the bore 2, and the boost piston 5 is itself provided with a longitudinal stepped bore 6. An input member 7 works in the rearmost portion 8 of the bore 6, and is retained by a circlip 9. The input member 7 is actuated by an input rod 10 connected to a pedal (not shown), the rod 10 having a spherical head 11 which is retained in the input member 7. A valve means 12 also works in the boost piston bore 6, in a portion 13 of smaller diameter, and controls pressurisation of a boost chamber 14 defined in the bore 2 behind the boost piston 5 between a rearward seal 15 in the housing and a rearward seal 16 on the boost piston 5.

The diameters of the boost piston 5 and the bore 2 are arranged so that an annular chamber 17 which is connected to the inlet 3 surrounds the boost piston 5. This high pressure chamber 17 is defined between the rearward seal 16 on the boost piston 5 and a forward seal 18 mounted in the wall of the bore 2 at a point where the boost piston 5 is spaced from the bore 2. A further annular chamber 19 surrounds the boost piston 5 forward of the high pressure chamber 17. The chamber 19 is connected to the outlet 4, and is defined between the forward seal 18 and a further forward seal 20 on the boost piston 5. The sealing diameter of the seal 16 is greater than that of the seal 18, so that the high pressure fluid in the annular chamber 17 acts to bias the boost piston 5 rearwardly. The seals 15, 16 and 18 all comprise a polytetrafluoroethylene (P.T.F.E.) sealing ring 21 backed by an O-ring 22. These seals, which are particularly suitable for use in high pressure systems as they have low hysteresis characteristics, also have a limited amount of radial resilience or tolerance, so that they can be subjected to some radial deformation without affecting their sealing properties. However, they also have a tolerance to relatively large radial clearances, without extruding under high pressures. Thus the seal 18 can seal the chamber 17 reliably, and without extrusion.

An inclined passage 23 in the boost piston 5 leads from the annular reservoir chamber 19 to the bore portion 13. Similarly, radial passages 24 connect the annular chamber 19 to the bore portion 13, and an inclined passage 25 connects the boost chamber 14 to the bore portion 13. Communication between the passages is controlled by the valve means 12.

The valve means 12 comprises a cylindrical spool 26 working in the bore portion 13, and biassed rearwardly by a spring 27. The spool 26 has a port 28 for controlling communication between passages 24 and 25. The port 28 is connected by radial passages 29 to a blind bore 30 in the spool 26 which opens into a chamber 31 defined in the bore portion 13 forward of the spool 26. The passage 23 opens into the chamber 31 in the retracted position shown so that the boost chamber 14 is in communication with the reservoir chamber 19.

The chamber 31 forms an auxiliary pressure chamber, the pressure in which acts on an auxiliary piston 32 which works in a portion 33 of the bore 13 of larger diameter. The travel of the auxiliary piston 32 is limited by an end member 34 located in the bore 13. A spring 35 works between the end member 34 and the auxiliary piston 32 to bias the piston 32 rearwardly. The auxiliary piston 32 acts on an output rod 36 which is adapted to actuate a master cylinder assembly (not shown).

The auxiliary piston 32 and the spool 26 are sealed in the bore 6 by seals 37 and 38 respectively.

It can be seen that the construction of the booster is relatively simple and compact, and assembly of the booster is facilitated by this. Once the parts are assembled in the boost piston 5 and the seals 15 and 18 are in place the boost piston 5 is inserted through the forward end of the bore 2, with the forward seal 18 deforming radially to allow the greater sealing diameter of the seal 16 to pass through it, and then returning to seal against the boost piston 5. As explained above, the seal 18 can tolerate the relatively high diametral clearance, 0.5 mm in this embodiment, between the boost piston 5 and the bore 2 without extrusion since it has a loaded P.T.F E. ring as its sealing face. Such a seal can in fact tolerate 0.8 mm diametral clearance, but the diameters are chosen so that the annular chamber 17 can transmit fluid from the high pressure source to the passages 24, and chamber 19 will connect outlet 4 to passage 23 at all stages of piston travel.

The operation of the booster is as follows. In the retracted position shown the auxiliary chamber 31 and the boost chamber 14 are in communication with the reservoir chamber 19. Pressure in annular chamber 17 acts to bias the boost piston 5 rearwardly. When the pedal is operated, the load is applied to the input member 7 by the input rod 10. The input member 7 moves forward, and advances the spool 26 against the force in the spring 27. Movement of the spool 26 cuts off the passage 23 from the chamber 31, and hence from the boost chamber 14. Further movement of the spool 26 opens communication between passages 24 and 25 via the port 28 to allow high pressure hydraulic fluid into the boost chamber 14. Simultaneously the high pressure fluid is admitted into the auxiliary chamber 31, through passages 29 and blind bore 30, to act on the auxiliary position 32. The areas of the boost piston 5 and auxiliary piston 32 are arranged so that at this stage of actuation the forces acting on the boost piston 5 in a forward direction are less than or equal to the forces acting on the boost piston 5 in a rearward direction. For this embodiment this means that (ignoring spring and friction forces) the area of the boost chamber 14 is less than or equal to the area of piston 32. Therefore the boost pressure in auxiliary chamber 31 acts on the auxiliary piston 32 to advance it and the output rod 36 relative to the boost piston 5 to actuate the master cylinder and take up the clearances in the braking system. The auxiliary piston 32 engages with end member 34, which prevents further movement of the auxiliary piston 32 relative to the boost piston 5.

When the auxiliary piston 32 engages with end member 34 the force acting on the auxiliary piston 32 due to the boost pressure in auxiliary chamber 31 is transmitted to the boost piston 5 to cancel out the rearwardly-acting force due to the boost pressure in the auxiliary chamber 31 acting directly on the boost piston 5. The rearwardly-acting force on the boost piston 5 is therefore reduced, and the boost piston 5 advances in the bore 2 to augment the output force.

The boost pressure also acts on the spool 26 in a rearward direction, and this reaction force is transmitted to the input member 7 to generate "feel" at the pedal. When the reaction force on the spool 26 equals the applied load from the pedal the boost piston 5 moves forward relative to the spool 26, cutting off communication between passage 24 and the port 28. The booster is then in its equilibrium or null position.

If the load on the pedal is reduced, but not wholly removed, the spool 26 will be able to move rearwardly relative to the boost piston 5 to open the passage 23, allowing the boost pressure to reduce and the boost piston to move rearwardly until the equilibrium position is reached again.

When the load on the pedal is removed, the spool 26 moves rearwardly to open the passage 23 to connect the auxiliary chamber 31 and the boost chamber 14 to the reservoir. The spool 26 and boost piston 5 move rearwardly, and when the boost pressure is reduced to a low level the spring 35 moves the auxiliary piston 32 back to its retracted position.

The booster shown in FIG. 2 is basically similar in construction to that shown in FIG. 1, and corresponding reference numerals have been applied to corresponding parts. The differences lie in the arrangement of the valve means 12 and the use of a reducer mechanism 39, which replaces the auxiliary piston 32, to make the booster output reactive instead of input reactive.

Thus the general construction of the boost piston 5 is similar to that of FIG. 1, with the sealed annular chambers 17 and 19 surrounding the boost piston 5, and the input member 7 working in the bore 6 in the boost piston 5. The valve means 12, however, comprises a two-piece spool 40, and a spring 41 acts between an enlarged shoulder 42 at the rear end of the spool 40 and a step 43 in the bore 6 to bias the spool rearwardly. A first spool piece 44 at the forward end has a port 45 which is permanently connected to the passage 23 leading to the reservoir chamber 19. The port 45 is connected by passages 46 to a blind bore 47 opening onto an axial bore 48 in a second spool piece 49. At its rearward end the spool piece 49 is provided with a diametral passage 50 connecting the bore 48 to a chamber 51 in the portion of the bore 6 in which the input member 7 works. Any pressure in chamber 51 acts rearwardly on the input member 7, but the chamber 51 is always connected to the reservoir chamber 17 by passage 50, bores 48 and 47, port 45 and passage 23 so that this pressure is constant.

The second spool piece 49 has an annular port 52 which controls communication between passages 24 and 25 to control communication between high pressure chamber 17 and the boost chamber 14. A port 53 on the second spool piece 49 is connected to the axial bore 48 by a diametral passage 54. The port 53 controls communication between the reservoir chamber 19 and a passage 55 in the boost piston 5 which leads to the boost chamber 14.

Instead of the auxiliary piston 32, a reducer mechanism 39, which comprises a rubber block 56, is located in the forward end of the bore 6 between the boost piston 5 and the output rod 36. The block 56 transmits a proportion of the load applied to the master cylinder through the valve means 12 back to the input member 7 to generate feel at the pedal. The booster is therefore output reactive rather than input reactive as in FIG. 1, in which action of the boost pressure provided the feel at the pedal.

The assembly of the booster of FIG. 2 is similar to that of FIG. 1, with the assembled boost piston 5 being inserted into the housing 1 through the forward end of the bore 2, so that the sealing diameter at the seal 16 passes through and resiliently deforms the seal 18 radially, the seal 18 then returning to seal on the boost piston 5.

In the inoperative position shown, all the parts are retracted, and the boost chamber 14 is connected to the reservoir chamber 19. When a load is applied to the pedal, the input member 7 advances, moving the spring spool 40 against the force in the spring 41 and into contact with the block 56. Firstly the port 53 cuts off communication between the boost chamber 14 and the reservoir chamber 19, and then the port 52 opens communication between passages 24 and 25, to admit high pressure fluid to the boost chamber 14. The boost piston 5 advances in the bore 2, and applies a force to the master cylinder which is transmitted through the rubber block 56 and the output rod 36.

The reaction of the load applied to the master cylinder acts in a rearward direction and is transmitted through the output rod 36 to the block 56, deforming the block 56. The load applied to the master cylinder is reduced by the block 56 and this reduced load is fed back to the pedal through the spool 40 and the input member 7 to provide a reaction or feel at the pedal.

When the reaction applied to the spool 40 exceeds the load applied by the pedal the spool 40 moves relatively rearwardly until communication between the passages 24 and 25 is cut off. The booster is then in its equilibrium position.

If the input load is reduced, the block 56 urges the spool 40 rearwardly through a further distance to re-establish communication between the boost chamber 14 and the reservoir chamber 19, until the equilibrium position is reached again.

When the input load is removed altogether, the spool 40 moves rearwardly to connect the boost chamber 14 to the reservoir chamber 19, and the parts move back to their retracted positions shown.

Thus our invention provides for boosters which are simple in construction, and whose assembly is facilitated so that the cost of the booster is reduced.

I claim:

1. An hydraulic booster for a vehicle braking system comprising a housing provided with a bore of stepped outline, an inlet for connection to a source of high pressure hydraulic fluid and an outlet for connection to a reservoir for fluid, a pedal-operated input member, a boost piston of stepped outline for actuating a master cylinder assembly working in said bore, and means defining a boost chamber in said bore, said boost piston being advanced in said bore in response to pressurisation of said boost chamber by fluid from said source, and valve means operable in response to a load applied to said input member to control pressurisation of said boost chamber, said valve means being operable to control communication between said inlet and said boost chamber and between said boost chamber and said outlet, wherein the diameters of said bore and said boost piston are arranged and sealed to provide an annular chamber surrounding said boost piston and connected to said inlet, such that a sealing diameter of said boost piston at a rearward end of said annular chamber is greater than a sealing diameter of said boost piston at a forward end of said annular chamber, with a radial clearance provided between said boost piston and said bore at said forward end of said annular chamber, and a forward seal between said bore and said boost piston at said forward end of said annular chamber is mounted in the wall of said bore such that said forward seal is radially deformable and is able to tolerate said radial clearance between said bore and said boost piston, said sealing diameters of said piston being chosen so that said boost piston can be assembled from the forward end of said bore, with said forward seal deforming radially to allow the passage of said greater rearward sealing diameter of said boost piston and returning to seal said lesser forward diameter.

2. A booster as claimed in claim 1, wherein said forward seal comprises a ring of polytetrafluoroethylene backed by an O-ring.

3. A booster as claimed in claim 1, wherein said diameters of said bore and said boost piston are arranged so that a second annular chamber, connected to said outlet, is formed round said boost piston, with said forward seal providing a seal between said high pressure annular chamber and said second annular chamber.

4. A booster as claimed in claim 1, wherein said booster has an auxiliary piston on which fluid from said source acts, in response to an initial movement of said input member, before said boost piston is advanced in said bore.

5. A booster as claimed in claim 1, wherein said booster is of the output reactive type having a reducer mechanism, with a load from said master cylinder assembly being transmitted to said pedal-operated input member through said reducer mechanism and said valve means.

6. A booster as claimed in claim 1, wherein said boost piston is provided with a bore, and said valve means comprises a spool working in said bore in said boost piston.

7. A booster as claimed in claim 1, wherein said boost piston is provided with a bore, and said pedal-operated input member comprises an input piston working in said bore in said boost piston.

* * * * *